(12) United States Patent
Williamson

(10) Patent No.: US 9,489,439 B2
(45) Date of Patent: Nov. 8, 2016

(54) GENERATING PORTABLE INTERPOLATED DATA USING OBJECT-BASED ENCODING OF INTERPOLATION RESULTS

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 676 days.

(21) Appl. No.: 13/037,322

(22) Filed: Feb. 28, 2011

(65) Prior Publication Data

US 2012/0221584 A1    Aug. 30, 2012

(51) Int. Cl.
*G06F 17/30* (2006.01)

(52) U.S. Cl.
CPC ... *G06F 17/30569* (2013.01); *G06F 17/30914* (2013.01)

(58) Field of Classification Search
None
See application file for complete search history.

(56) References Cited

U.S. PATENT DOCUMENTS

| | | | |
|---|---|---|---|
| 5,890,167 A | 3/1999 | Bridge, Jr. et al. |
| 5,978,796 A | 11/1999 | Malloy et al. |
| 6,360,188 B1 | 3/2002 | Freidman et al. |
| 6,366,922 B1 | 4/2002 | Althoff |
| 6,434,435 B1 | 8/2002 | Tubel et al. |
| 6,434,544 B1 | 8/2002 | Bakalash et al. |
| 6,594,672 B1 | 7/2003 | Lampson et al. |
| 6,609,123 B1 | 8/2003 | Cazemier et al. |
| 6,735,590 B1 | 5/2004 | Shoup et al. |
| 6,931,418 B1 | 8/2005 | Barnes |
| 7,152,062 B1 | 12/2006 | Draper et al. |
| 7,299,241 B2 | 11/2007 | Reed et al. |
| 7,660,822 B1 | 2/2010 | Pfleger |
| 2001/0049678 A1 | 12/2001 | Yaginuma |
| 2002/0029207 A1 | 3/2002 | Bakalash et al. |
| 2002/0035562 A1 | 3/2002 | Roller et al. |
| 2002/0083034 A1 | 6/2002 | Orbanes et al. |
| 2002/0087516 A1 | 7/2002 | Cras et al. |

(Continued)

OTHER PUBLICATIONS

Using OLAP and Multi-Dimensional data for decision making, Hasan et al. IEEE 2001.

(Continued)

*Primary Examiner* — Miranda Huang
(74) *Attorney, Agent, or Firm* — Lowenstein Sandler LLP

(57) ABSTRACT

Embodiments relate to systems and methods for generating portable interpolated data using object-based encoding of interpolation results. A database can store sets of operational data, such as financial, medical, climate or other information. For given data, a portion of the input data can be known or predetermined, while for a second portion can be unknown and subject to interpolation. The interpolation engine can generate a conformal interpolation function and interpolated input sets that map to a set of target output data. In aspects, the interpolation engine can interact with an object encoder module to access, extract, and encode the interpolated inputs and/or other data in an object-based format or schema, such as the extensible markup language (XML). The object encoder can generate an object-oriented interpolated data container to transmit to a local or remote database, and expose that container to sets of applications for access and use by those applications. The applications can include other interpolation packages, and/or conventional applications such as databases or spreadsheets which do not have native interpolation capability. The applications can share, exchange, and/or modified the object-based interpolation data container(s), and can request further interpolation processing on updated objects via interpolation requests to remote interpolation engines.

18 Claims, 6 Drawing Sheets

(56) References Cited

U.S. PATENT DOCUMENTS

| | | |
|---|---|---|
| 2002/0169658 A1 | 11/2002 | Adler |
| 2003/0114950 A1 | 6/2003 | Ruth et al. |
| 2003/0115194 A1 | 6/2003 | Pitts et al. |
| 2003/0115207 A1 | 6/2003 | Bowman et al. |
| 2003/0120372 A1 | 6/2003 | Ruth et al. |
| 2003/0126114 A1 | 7/2003 | Tedesco |
| 2003/0184585 A1 | 10/2003 | Lin et al. |
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0060382 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0162531 A1* | 7/2008 | van Eikeren ............ 707/102 |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2009/0248490 A1* | 10/2009 | Moncreiff ............ 705/10 |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-Weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Binding Multiple Interpolated Data Objects", U.S. Appl. No. 12/955,811, filed Nov. 29, 2010.

Williamson, "Systems and Methods for Validating Interpolation Results Using Monte Carlo Simulations on Interpolated Data Inputs", U.S. Appl. No. 13/037,344, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "Systems and Methods for Generating Interpolation Data Sets Converging to Optimized Results Using Iterative Overlapping Inputs", U.S. Appl. No. 13/037,341, filed Feb. 28, 2011.

ASPFAQ.com. "What are the valid styles for converting datetime to string?", (2006) http://database.aspfaq.com/database/what-are-the-valid-styles-for-converting-datetime-to-string.html.

Answering Joint Queries from Multiple Aggregate OLAP Databases, Pourabbas et al, LNCS 2737, pp. 24-34, 2003.

* cited by examiner

GENERATING PORTABLE INTERPOLATED DATA USING OBJECT-BASED ENCODING OF INTERPOLATION RESULTS

FIELD

The invention relates generally to systems and methods for generating portable interpolated data using object-based encoding of interpolation results, and more particularly, to platforms and techniques for extracting and encoding interpolation results in object-based containers, and exporting those containers to a local or remote database, to permit access by independent sets of applications that can then operate on the object-based interpolation data as native data, including to share, update, and potentially request remote downstream interpolation processing on that data.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

In cases where an interpolation study is conducted, the ultimate selection of interpolated inputs and other data used to perform the interpolation may itself contain implied information regarding the appropriate breakdowns of the data, judgments about which inputs should receive priority compared to others, and other attributes of the eventual input breakouts and the interpolation function developed for that data. In cases, the values for the interpolated inputs may be introduced by an analyst or other user acting to adjust those interpolated values, to determine alternative solutions.

In cases, it may be helpful or necessary to export sets of interpolation results to local or remote data stores, and/or to further sets of applications or software which may or may not be equipped to read, extract, and/or process interpolation-related data sets. For those and other purposes, it would be useful to enjoy a capability to encode operative interpolation data in an object-based or object-oriented file, object, or schema, and permit additional or independent applications to access that data, and potentially share and/or modify that day. It may be desirable to provide systems and methods for generating portable interpolated data using object-based encoding of interpolation results, in which sets of interpolation-related data can be encoded in object-based or object-oriented containers or other encapsulations, and export those objects to a data store accessible to diverse applications over the Internet, and/or other network connections.

DESCRIPTION

Figure 1:
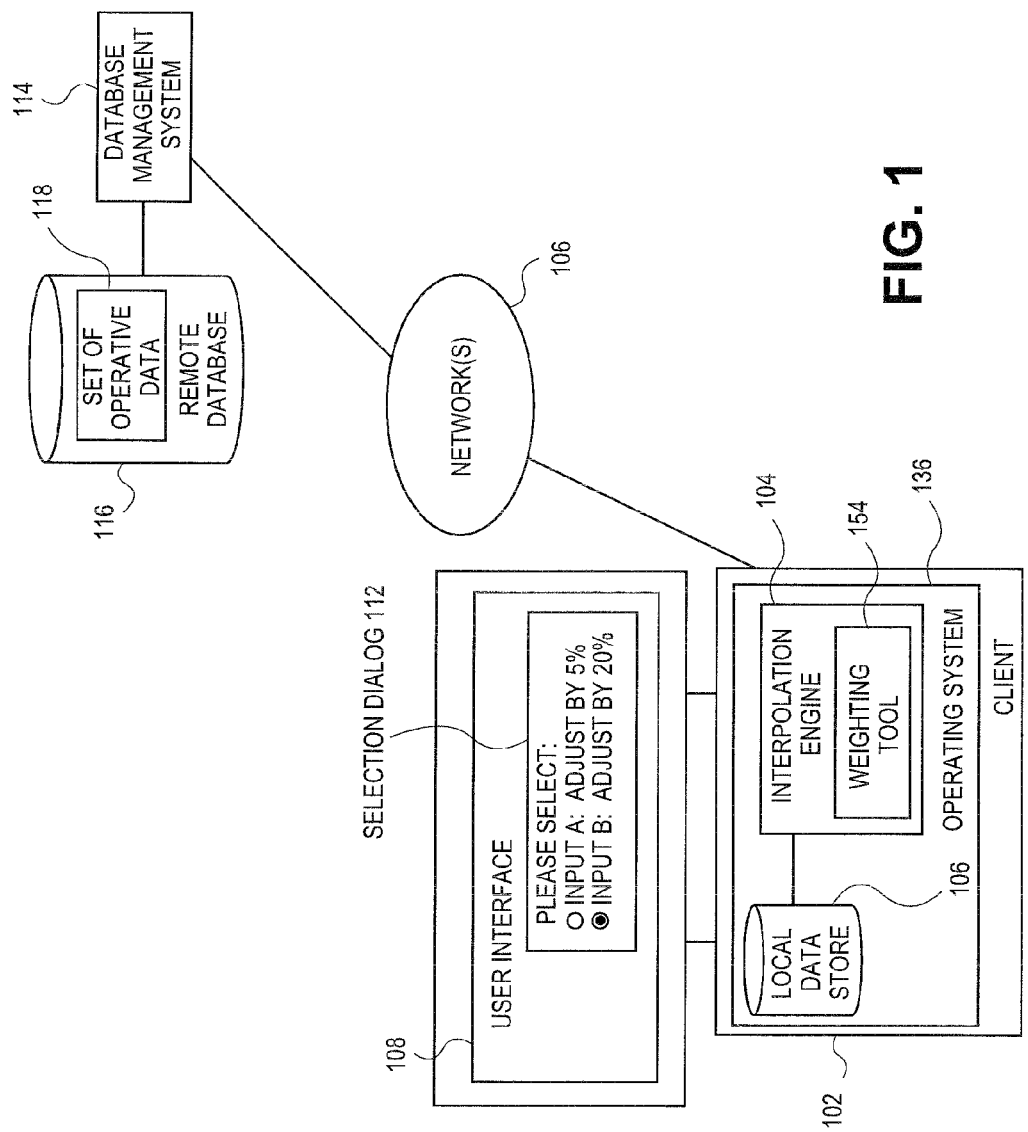
FIG. 1 illustrates an overall network architecture which can support the generation of interpolated input sets based on a target output, according to various embodiments of the present teachings.

Embodiments relate to systems and methods for generating portable interpolated data using object-based encoding of interpolation results. More particularly, embodiments relate to an interpolation engine, overall, platform and related techniques which can be configured to generating portable interpolated data using object-based encoding of interpolation results. In terms of the interpolated data which the interpolation engine or other module, tool, or logic can access and operate on, that underlying data can be generated by one or more underlying interpolation platforms which access or retrieve a set of historical, operational, archival, or other operative data related to captured technical, financial, medical, or other operations, and supply that operative data to an interpolation engine. The interpolation engine can also be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for the interpolation platform can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data.

In cases, an analyst, operator, and/or other user may wish to generate and explore variations, modifications, and/or alternatives to the historical input data and/or the interpolated portions of that data, or possibly of the output data. In such scenarios, a user can invoke a weighting tool hosted in the interpolation engine, in order to a weighting dialog to input user-selected or specified weights to apply to one or more of the set of predetermined data, and/or interpolated input data or other data. The user can pursue different scenarios using different sets of weights that they have entered, to compare different outcomes or series of input and output data. In an economic study investigating the effects of interest rates on housing sales, for example, a user may assign a weight of 1.1 (i.e., increase the value or significance by 10%) to the prevailing interest rate for a certain category of housing over the first quarter of 2009, while inputting or assigning a weight of 0.9 (i.e., decrease the value or significance) to the amount of housing stock available in the same quarter. The user can then view the results of that adjustment on the predetermined output data to examine whether that output remains at its initial or desired value, and/or to see the effects on the set of interpolated input data, such as for instance average time on market for a housing unit, due to that altered scenario. Other variations or combinations of data weightings of course are possible.

In cases, the interpolation engine, weighting tool, and/or other logic can generate different combinations of the set of interpolated input data in different generations, series, and/or other alternative values or groupings, to permit an analyst or other user to manipulate the input values, to observe different ramifications of different weights that may be applied to parts of, and/or time periods for, the set of interpolated inputs and/or other components of the data. The user of the weighting tool can be presented with a weighting dialog or other interface to manipulate the weights, scales, and/or other modifiers to be applied to the set of interpolated input values, and select or adjust those values (and/or the interpolation function used to generate those values). The analyst or other user can thereby determine scenarios, sets of weights to be applied to the known inputs or other types of data, and examine the effects on the output data, to determine for instance whether the known output data can be maintained or maintained within desired ranges under different weighting conditions. The ability to analyze and derive input sets under different weights, time periods for those weights, and/or other selective adjustments may permit an operator to explore or derive new series of input data that may produce already-known or desired outputs, and/or other outputs if those inputs are varied by relative importance or weight. In aspects, the interpolation function that may accept the weighted input values and still maintain or output the set of known or fixed output data can also be identified or generated.

After completion of those or other types of interpolation studies or reports, according to the present teachings, the sets of weights, the sets of time periods for those weights, the set of resulting interpolated input values and other data can be stored to a local or remote data store. According to embodiments of the present teachings, that data can then be accessed or retrieved by the same interpolation platform and/or weighting tool, and/or other tools or users, for instance to perform further interpolation or modeling activity consistent with the weighted and/or interpolated values and target output data.

In embodiments, and also after completion of those or other types of interpolation studies or reports, according to the present teachings, a user can invoke an object encoder and/or other logic or service, to access, extract, and/or encode or encapsulate the constituent data of an interpolation run or study, and prepare and configure that data for export to a local or remote database in an object-oriented format, layer, or data model. In aspects, one or more external or independent applications can access the object-based data container hosting the interpolation-based data, and retrieve and operate on that data as an original, native, empirical, and/or otherwise valid source data layer, for instance to perform spreadsheet, database, modeling, statistical, and/or other downstream processing. The applications accessing the interpolation results in the object-based data container can share and/or modify the object-based or object-oriented data container and/or portions therefor on a shared basis, and in aspects can transmit those data containers and/or updates to those containers to remote interpolation engines or services, for instance to request further or downstream interpolation operations. Other data transport and processing operations can be carried out on the object-oriented interpolation data containers generated according to the present teachings.

Consistent with the foregoing, in embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflecting expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2A:
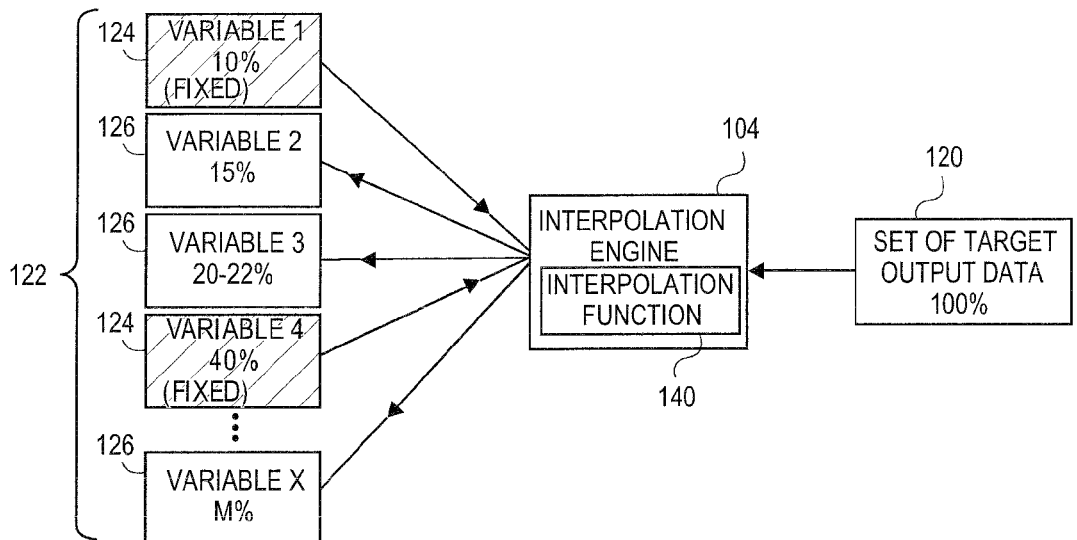
FIGS. 2A-2B illustrate various exemplary sets of input data that can be produced by interpolation techniques whose output and other data can be used in systems and methods for generating portable interpolated data using object-based encoding of interpolation results, according to various embodiments.
Figure 2B:
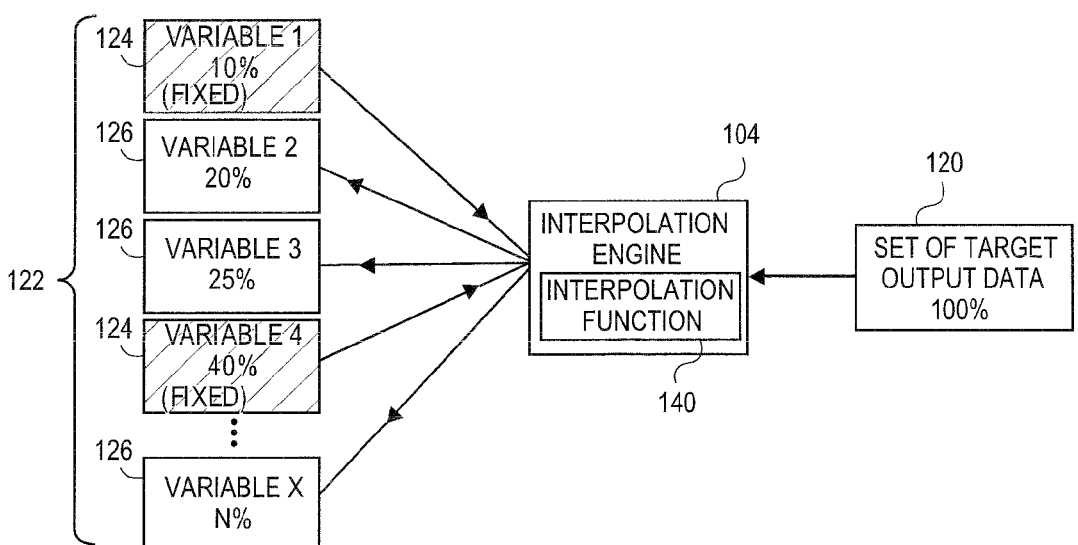

In embodiments, and as shown in FIGS. 2A-2B, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 140. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled "Systems and Methods for Interpolating Conformal Input Sets Based on a Target Output," filed on Aug. 31, 2010, having the same inventor as this application, assigned or under obligation of assignment to the same entity as this application, and incorporated by reference in its entirety herein, can be used in determining interpolation function 140, configuring and/or executing interpolation engine 104, and/or performing other related operations. In aspects, the interpolation engine 104 can also comprise, host, and/or access a weighting tool 154, which may be used to open or initiate a weighting dialog and receive user inputs, selections, and/or other manipulations to the set of predetermined input data 124 and/or other data components, to generate different or alternative data series for comparative examination or other purposes, as described herein.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize thie interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted, when the possible conformal set of interpolated inputs 126 is not unique, the interpolation engine 104 can generate a set of interpolated input series, each series containing a set of interpolated input data 126 which is different and contains potentially different interpolated inputs from other conformal data sets in the set of interpolated input series. In cases where such alternatives exist, the interpolation engine 104 can generate and present the set of interpolated input series, for instance, in series-by-series graphical representations or otherwise, to select, compare, and/or manipulate the results and values of those respective data sets. In embodiments, the analyst or other user may be given a selection or opportunity to choose one set of interpolated input data 126 out of the set of interpolated input series for use in their intended application, or can, in embodiments, be presented with options to continue to analyze and interpolate the set of operative data 118, for example to generate new series in the set of interpolated input series. Other processing options, stages, and outcome selections are possible.

Figure 3:
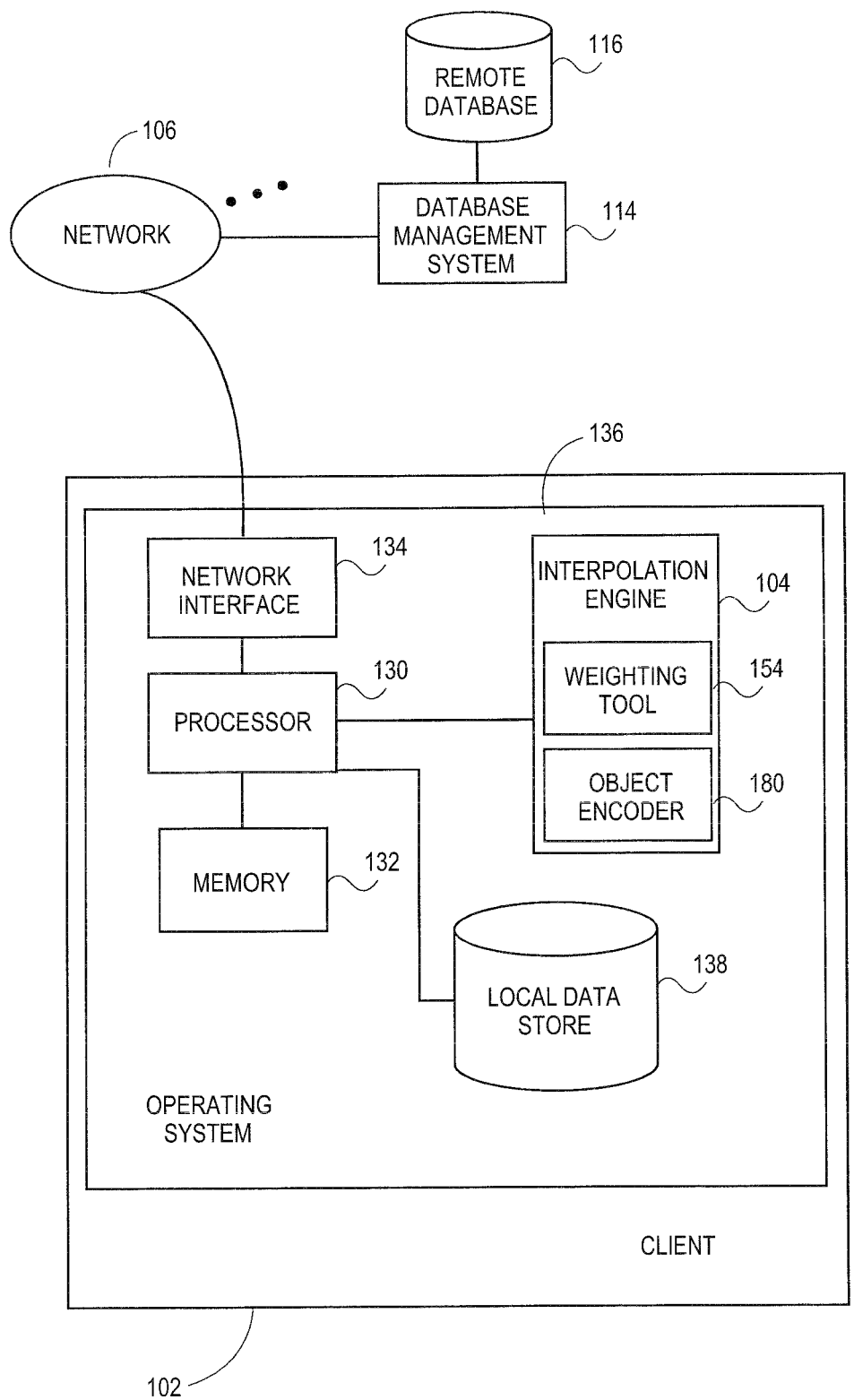
FIG. 3 illustrates an exemplary hardware configuration for client machine which can host or access interpolation processes whose output and related data can be used in systems and methods for generating portable interpolated data using object-based encoding of interpolation results, according to various embodiments.

FIG. 3 illustrates an exemplary diagram of hardware and other resources that can be incorporated in a client 102 that can host interpolation engine 104, and/or other logic or resources, and/or otherwise be used in connection with systems and methods for generating portable interpolated data using object-based encoding of interpolation results, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114, object encoder 180, and/or other servers, engines, hardware, services, software, logic, and/or other platforms can be or include a computer system comprising the same or similar components as the client 102, or can comprise different hardware and software resources.

Figure 4:
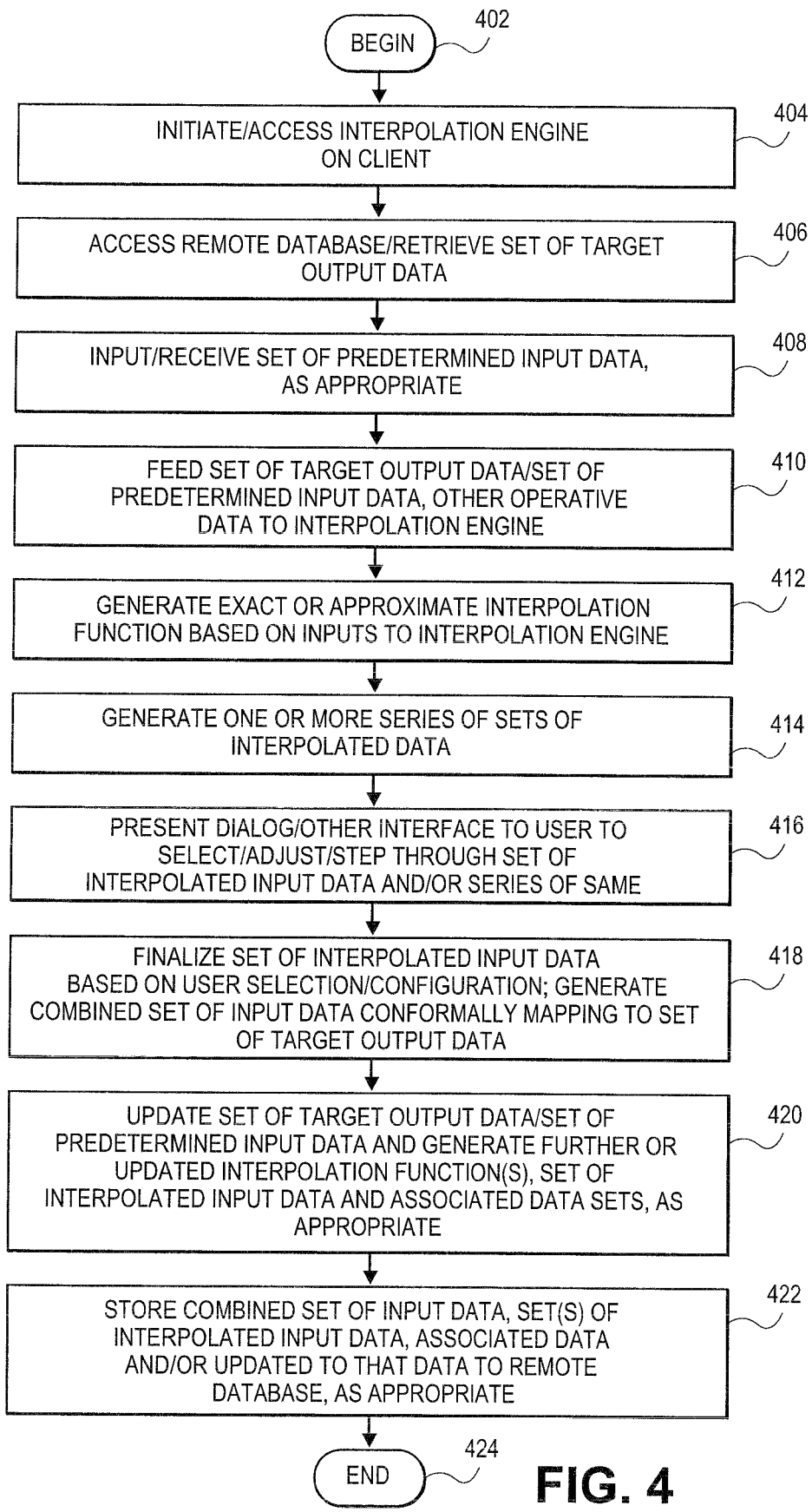
FIG. 4 illustrates a flowchart for overall interpolation, function determination, and other processing that can be used to produce conformal input sets based on a target output that can be used in systems and methods for generating portable interpolated data using object-based encoding of interpolation results, according to various embodiments.

FIG. 4 illustrates a flowchart of overall processing to generate interpolation functions, sets of interpolated data, and other reports or information, according to various embodiments of the present teachings. In 402, processing can begin. In 404, a user can initiate and/or access the interpolation engine 104 on client 102, and/or through other devices, hardware, or services. In 406, the user can access the remote database 116 via the database management system 114 and retrieve the set of target output data 120 and/or other associated data or information. In 408, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 410, the set of target output data 120, the set of predetermined input data 124, and/or other data in set of operative data 118 or other associated data can be fed to interpolation engine 104.

In 412, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 414, the interpolation engine 104 can generate one or more subsets of interpolated input data 126, and/or one or more set of interpolated input series 128 containing individual different combinations of subsets of interpolated input data 126. In aspects, the set of interpolated input data 126 and/or the set of interpolated input series 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or the set of interpolated input series 128 can be generated by producing sets of possible interpolated inputs which are then presented to the user via the selection dialog 112, for instance to permit the user to accept, decline, or modify the values of set of interpolated input data 126 and/or the set of interpolated input series 128.

In 416, the interpolation engine 104 can present the selection dialog 112 to the user to select, adjust, step through, and/or otherwise manipulate the set of interpolated input data 126 and/or the set of interpolated input series 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or set of interpolated input series 128 through different interface mechanisms, such as slider tools to slide the value of different interpolated inputs through desired ranges. In 418, the user can finalize the set of interpolated input data 126, and the interpolation engine 104 can generate the resulting combined set of input data 122 which conformally maps to the set of target output data 120. In 420, the set of target output data 120, set of predetermined input data 124, and/or other information related to the set of operational data 116 and the analytic systems or phenomena being can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 422, the combined set of input data 122, the set of interpolated input data 126, the set of interpolated input series 128, the interpolation function 140, and/or associated data or information can be stored to the set of operative data 118 in the remote database 116, and/or to other local or remote storage. In 424, as understood by persons skilled in the art, processing can repeat, return to a prior processing point, jump to a further processing point, or end.

According to embodiments of the present teachings, as noted, the interpolation engine 104 and/or other logic or service can be configured to interact with an object encoder to extract, condition, and encode the set of operative data 118 and/or any other data related to interpolation processing in an object-based or object-oriented container, wrapper, or other stored data object.

Figure 5:
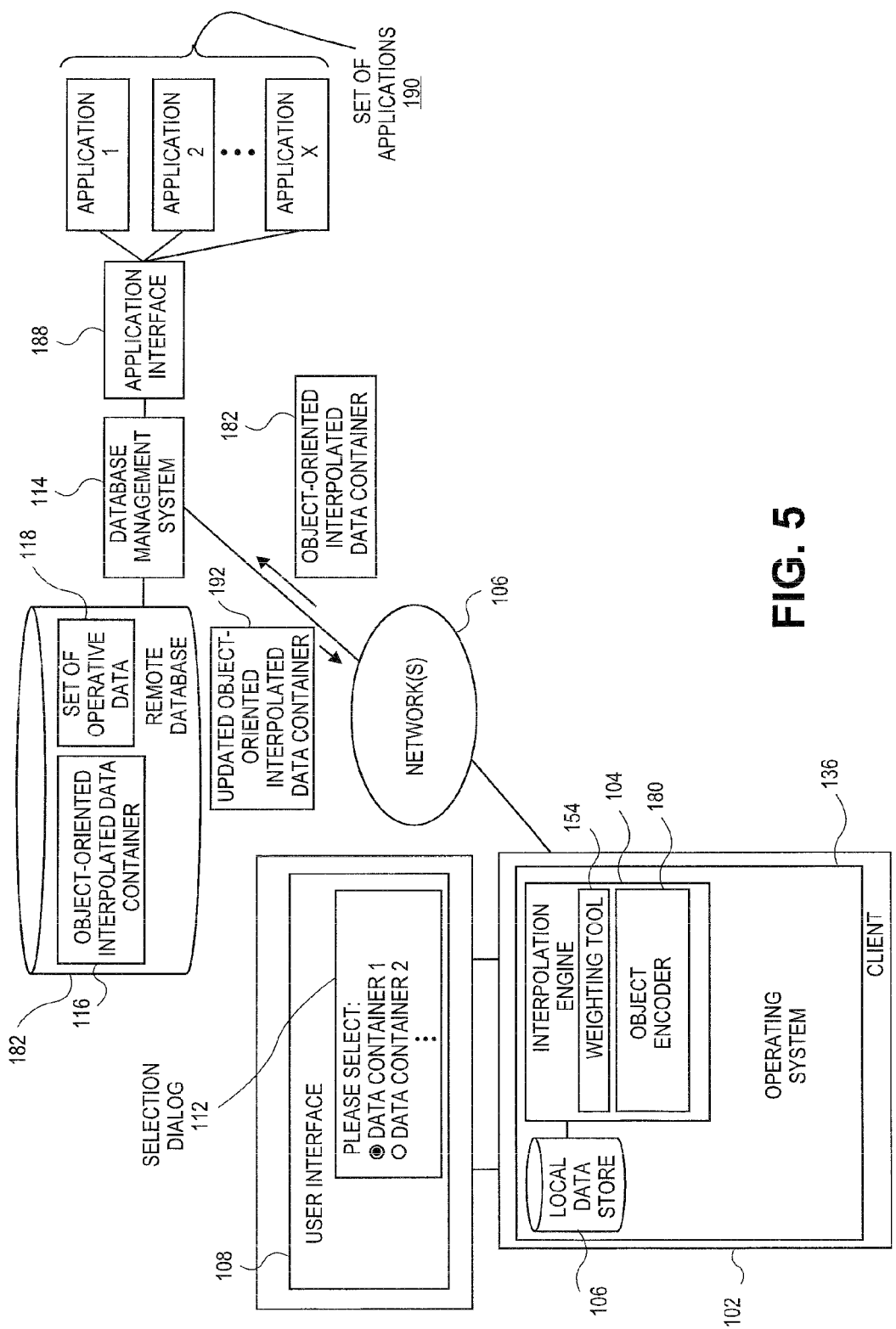
FIG. 5 illustrates an exemplary network configuration that can be used in conjunction with systems and methods for generating portable interpolated data using object-based encoding of interpolation results, according to various embodiments of the present teachings.

More particularly, and as for shown in FIG. 5, in embodiments, the interpolation engine 104 of client 102 and/or associated logic or services can be configured to access and/or extract a set of operative data 118 including a set of combined input data 122, and operate on or process that data and/or other data sources to generate an object-oriented wrapper, container, and/or other representation or encoding of that data. In aspects, the object-based encoding or representation of the set of operative data 118 can be transmitted to a local or remote data, and can be exposed via an application interface to a set of applications which can then extract and operate on that data. The set of applications can read and operate on the object-oriented or object-based representation of the data, and/or components or selections thereof, even if those applications do not have a native capability to perform interpolation operations including to infer or generate values of unknown or missing data. The set of operative data that the applications access and extract can supply missing data, fields, or variables through interpolation results, and permit those applications to operate on the complete set of populated data including interpolated values acting as original or empirical values. The set of applications can also be configured to share the object-oriented container with the constituent interpolation variables, and/or selections of portions of those variables and data, and transmit an updated version of the object-oriented container back to the source data store. The applications in the set of applications 190 can likewise be configured to request interpolation operations by commands or messages to the 804, object encoder 180, and/or other logic, site, and/or service, and therefor invoke remote interpolation processing to fill in, infer, deduce, condition, generate, and/or otherwise treat data that may be incomplete or under-determined within the set of object-oriented or object based interpolated data containers that the applications may be accessing and processing.

More particularly, and as for instance illustrated in FIG. 5, in embodiments, the client 102 can host an object encoder 180 configured to access, retrieve, extract, and/or process data that may not be originally stored or encoded in object-based or object-oriented format, and translate, convert, and/or otherwise configure that source data in an object-based or object oriented format. In aspects, the object encoder 180 can be configured to store or encode data in one or more than one object-based or object-oriented format, such as extensible markup language (XML) format and/or derivative or associated formats based on the extensible markup language (XML) schema or standard. Other object-based or object-oriented formats, standards, and/or protocols can be used. In aspects, in general the object encoder 180 can interact with the interpolation engine 104 and/or other applications, engines, logic, and/or services to access the set of operative data 118, components of that data, and/or other interpolation-based or interpolation-related data and generate, store, and/or encode object-based representations of that data. In aspects, the object-based representation can be stored or encoded in an object-oriented interpolated data container 182, such as and XML or XML-based wrapper or container. The encoding and storage of the set of operative data 118, including the set of combined input data 122 comprising the set of predetermined input data 124 and set of interpolated input data 126, can permit the transmission, sharing, updating, and/or exchange of that data with other interpolation engines or tools, and/or other applications or software which may not have native interpolation capability, such as spreadsheet, database, modeling, and/or other applications.

More particularly, and as also shown in FIG. 5, in aspects the object encoder 180 and/or other logic or service can access the set of operative data 118 hosted in the remote database 116 via the database management system 114 and/or other channel or interface, and retrieve or extract the set of operative data 118 and/or components of that data. The object encoder 180 can decompose that data into variables, fields, attributes, scripts, functions, and/or other components, and generate corresponding classes, attributes, inheritances, and/or other object-based or object-oriented features, parameters, attributes, or characteristics, and encode the set of operative data 118 and/or selected components of that data in the object-oriented interpolated data container 182. In aspects, the object encoder 180 and/or other logic or service can transmit the object-oriented interpolated data container 182 to the remote database 116, and store or host that container or other object in the remote database 116 and/or other local or remote data store. In embodiments, as part of the processing of preparing or conditioning the object-oriented interpolated data container 182 for transport and storage, the object encoder 180 can serialize the object-oriented interpolated data container 182 and/or portions thereof for transmission to the remote database 188 and/or other storage target.

According to aspects, the object-oriented interpolated data container 182 transmitted an installed in the remote database 118 can be exposed to and/or accessed by a set of applications 190 via an application interface 188. In aspects, the set of applications 190 can be or include other interpolation applications, tools, packages, and/or software, and/or can be or include applications that are not designed for interpolation operations, such as conventional spreadsheet applications, database applications, modeling applications, statistical applications, and/or other software, tools, utilities, or applications. In aspects, the application interface 188 through which the set of applications can access the object-oriented interpolated data container 182 can include file systems and/or directory services, such as the lightweight directory access protocol (LDAP) and/or other directory systems, for instance exposed via a Web interface. Each application and/or other software in the set of applications 190 can thereby access, read, extract, and/or process the object-oriented interpolated data container 182 as native data within each of those applications. In aspects, after any one or more application has operated on the object-oriented interpolated data container 182 and possibly revised, modified, and/or updated that data and/or portions thereof, the application or applications can save or encode the modified data set in an updated object-oriented interpolated data container 192, which the application can likewise store to the remote database 116 and/or other data store via the application interface 188, database management system 114, and/or other interface or connection.

In cases, one or more application in the set of applications 190 can further request that interpolation operations be carried out on the updated object-oriented interpolated data container 192 and/or other data, for instance in situations where the requesting application has no interpolation capability of its own. In such instances or others, one or more application in the set of applications 190 can transmit an interpolation request, command, instruction, and/or other data to the interpolation engine 104 and/or other logic or service, and request the interpolation of one or more variables in a set of combined input data 122 or otherwise. In aspects, the application or applications may transmit an interpolation request when further processing on the object-oriented interpolated data container 182 and/or updated object-oriented interpolated data container 192 has produced or identified one or more existing, new, and/or additional variables whose value is missing, invalid, under-determined, and/or otherwise not present, not clear, or otherwise in need of calculation or development via an interpolation process. In aspects, two or more applications in the set of applications 190 can exchange, directly or indirectly, the object-oriented interpolated data container 182, updated object-oriented interpolated data container 192, and/or any selected portions thereof between themselves, for joint or successive processing of that data on a shared or exchanged basis. The sharing and possible joint or successive operation on the object-oriented interpolated data container 182, updated object-oriented interpolated data container 192, and/or other data can be performed, in part, due to the portable or compatible nature of the object-based or object-oriented nature of that data and its representation in extensible markup language (XML) and/or other object-based, object-oriented, and/or self-describing data protocols or formats. It may be similarly noted that applications in the set of applications 190 can access, select, separate, divide, and/or otherwise operate on selected sections, variables, field, dimensions, and/or other components of the object-oriented interpolated data container 182, updated object-oriented interpolated data container 192, and/or other subject data being read out and processed by the set of applications 190 and/or other applications or software. In aspects, those selected sections and/or other component of the interpolated data encoded in object-based form can be encoded and stored as separate files or objects, which themselves can then be accessed via the application interface 188 and/or other interface or connection. Those and other component objects, can, further, be merged or joined in processing and/or storage operations, stored to the remote database 118 and/or other local or remote data store, and then retrieve and operated on by the same or other applications in the set of applications 190. Other data exchange, storage, and/or processing activities can be performed on the 182, updated object-oriented interpolated data container 192, and/or other data in connection with object-based or object-oriented conditioning and/or encoding of the set of operative data 118 and/or other interpolation-related data or results.

Figure 6:
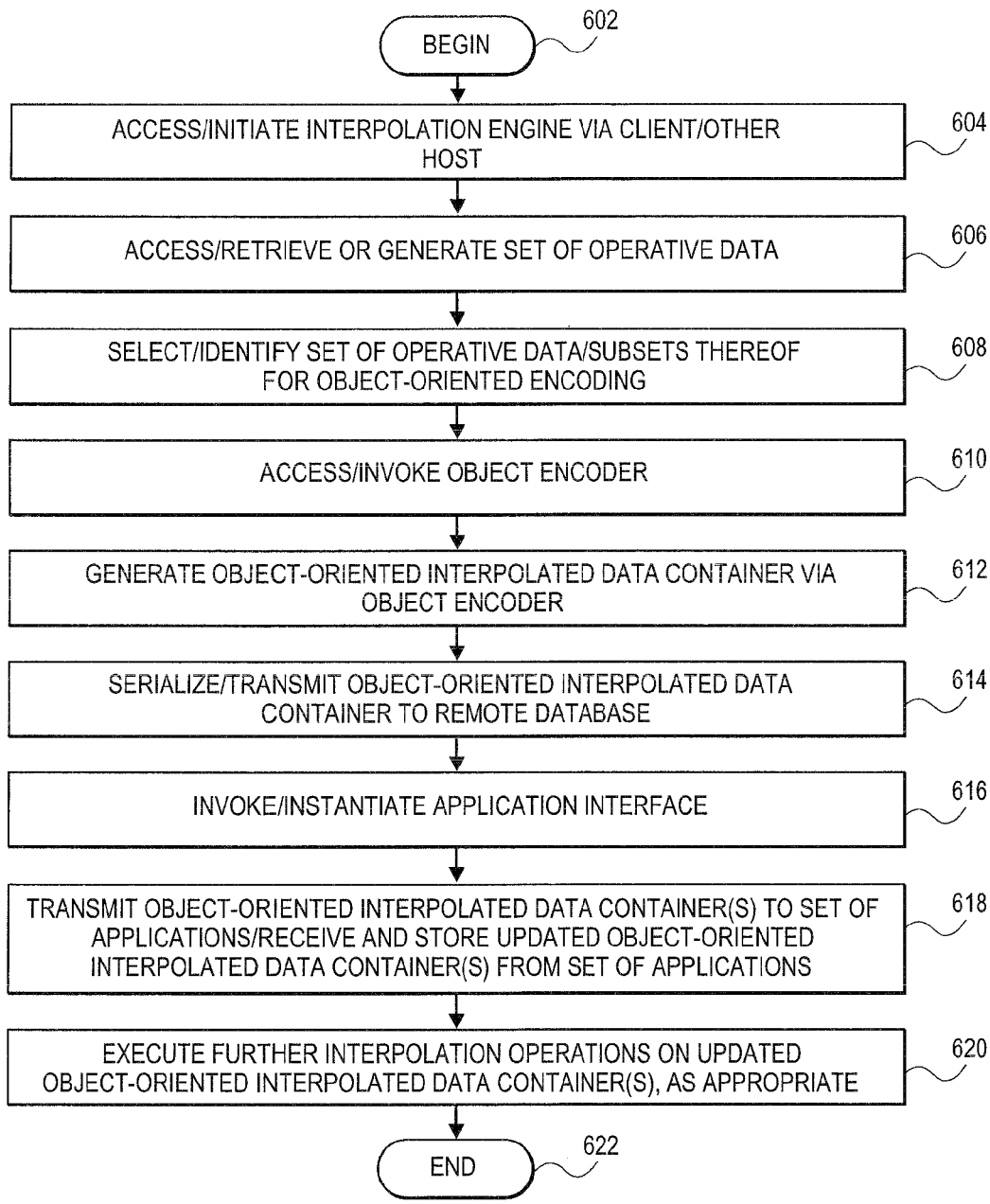
FIG. 6 illustrates a flowchart of processing that can be used in connection with systems and methods for generating portable interpolated data using object-based encoding of interpolation results, according to various embodiments.

FIG. 6 illustrates a process flow that can be used in systems and methods for generating portable interpolated data using object-based encoding of interpolation results, according to various embodiments. In 602, processing can begin. In 604, an analyst, operator, and/or other user can initiate and/or access the interpolation engine 104 on the client 102 and/or other platform or service, and open, initiate, and/or access selection dialog 112 via the interpolation engine 104 and/or other logic, application, service, and/or interface to begin interpolation processing including object-based data storage, export, and/or import activities. In 606, the interpolation engine 104 can access, elect, and/or retrieve the set of operative data 118 including the set of combined input data 122 that may have been generated during a previous interpolation activity, such as medical, climate, financial, and/or other research or activity. In 608, the set of operative data 118 and/or subsets thereof can be selected and/or identified, for instance via interpolation engine 104 and/or other logic or service, for object-oriented encoding. In aspects, the set of operative data 118 and/or subsets thereof, and/or other data, can be selected by user selection or input, for instance via selection dialog 112. In aspects, the set of operative data 118 and/or subsets thereof, and/or other data can be selected automatically, for instance, via the interpolation engine 104 and/or other logic, service, and/or applications, for instance by one or more applications in the set of applications 190 and/or other application(s) or software. In 610, the object encoder 180 can be invoked and/or accessed, for instance, automatically via the interpolation engine 104 and/or other logic or service, and/or by user selection via the selection dialog 112, and/or via other techniques.

In 612, the object-oriented interpolated data container 182 can be generated via the object encoder 180 and/or other logic or service. For instance, in embodiments, the object encoder 180 can access the selected set of operative data 118, including the set of combined input data 122 and/or other components of the set of operative data 118, and/or other data, and decompose that data into fields, classes, variables, parameters, and/or associated functions or attributes, and encode and/or store that data as data objects, object-oriented files, databases, trees, directories, and/or other data objects. In aspects, the object-oriented interpolated data container 182 can be configured to store the selected data components in an object-oriented format, protocol, code, model, schema, and/or container, such as an extensible markup language (XML) data object or container. Other object-oriented formats, protocols, codes, models, schemas, and/or containers can be used, such as those based on the simple object access protocol (SOAP), and/or others.

In 614, the object-oriented interpolated data container 182 can be serialized and/or transmitted to the remote database 118, and/or other local or remote database and/or data store for storage and encoding in the target data host. In 616, the application interface 188 to the remote database 118 can be invoked and/or instantiated, for instance, via user selection or input, via the object encoder 180 and/or interpolation engine 104, one or more applications in the set of applications 190, and/or via other channels, instructions, commands, or techniques. In aspects, the application interface 188 can comprise an application programming interface (API), a data protocol, model, and/or interface, and/or other interface, logic, and/or service to render the object-oriented interpolated data container 182 accessible, readable, and/or extractable to the set of applications 190 and/or other software, logic, or service. In aspects, the application interface can be or include a file system and/or directory interface, such as a lightweight directory access protocol (LDAP) interface, and/or other interface, protocol, and/or channel.

In 618, the application interface 188 and/or other logic or service can transmit one or more object-oriented interpolated data container(s) 182 to one or more applications in the set of applications 190, and/or receive and store one or more updated object-oriented interpolated data container(s) 192 from one or more applications in the set of applications 190. That is, in aspects, applications in the set of applications 190 can be read, extract, and/or consume one or more object-oriented interpolated data container(s) 182 that have been generated via the object encoder 180 and/or associated logic or services, as well as operate on that object-oriented data and return that data to the remote database 118 and/or other database or data store. The one or more object-oriented interpolated data container(s) 192 can thereby be shared, modified, and/or exchanged between applications in the set of applications 190 and/or other local or remote software or services, regardless whether those applications, software, and/or services generated the interpolated data or are configured to perform configuration operations, themselves. Likewise, one or more object-oriented interpolated data container(s) 182 and/or one or more updated object-oriented interpolated data container(s) 192 can be accessed or retrieved by the interpolation engine 104, object encoder 180, and/or other software, logic, engines, and/or services associated with interpolation facilities or services, so that further or downstream interpolation operations can be conducted on the one or more object-oriented interpolated data container(s) 182 and/or one or more updated object-oriented interpolated data container(s) 192 that have been used, accessed, and/or modified by the set of applications 190, to develop further interpolated inputs and/or other data that may arise from that shared use amongst diverse applications, and/or otherwise. In 620, the interpolation engine 104, object encoder 180, and/or other logic, site, and/or service can execute further interpolation operations on the one or more object-oriented interpolated data container(s) 182 and/or one or more updated object-oriented interpolated data container(s) 192, as appropriate. Further interpolation processing can for instance be invoked or initiated by a user, and/or can be initiated automatically, for instance, upon detection of an update to interpolated variables, and/or the introduction of additional variables, in the one or more updated object-oriented interpolated data container(s) 192, as appropriate. In 622, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Still further, while embodiments have been described in which a unitary weighting tool 154 is hosted in the interpolation engine 104 itself, in embodiments, the weighting tool 154 can be hosted or installed in a different local or remote host machine, logic, and/or service. In embodiments, the weighting tool 154 can comprise a plurality of tools or logic distributed in or over one or more machines, platforms, or services. For further example, while embodiments have been described in which the object-oriented interpolated data container 182 and updated object-oriented interpolated data container 192 are located remotely to the client 102, in embodiments, that data set or object and/or other data sets or object can be stored in local or remote distributed storage, for instance, in multiple directories or file systems in local storage and/or multiple remote storage sites. Other resources described as singular or integrated can in embodiments be plural or distributed, and resources described as multiple or distributed can in embodiments be combined. The scope of the invention is accordingly intended to be limited only by the following claims.

What is claimed:

1. A method comprising:
accessing operative data comprising a set of input data and a set of output data, wherein the set of input data comprises a set of interpolated input data generated to conformally map the set of input data to the set of output data;
decomposing the operative data into a set of component objects comprising at least one interpolated component object derived from the interpolated input data;
generating, by a processor and in view of a determination that the set of output data can be generated with multiple combinations of elements from the set of input data, an object-oriented interpolated data container storing at least a portion of the set of component objects, the portion comprising at least one interpolated component object;
exposing the object-oriented interpolated data container to a set of applications via an application interface, wherein the set of applications operates on the object-oriented interpolated data container to generate an updated object-oriented interpolated data container; and
in response to a request from one application from the set of applications that corresponds to a variable in the updated object-oriented interpolated data container whose value is invalid, performing further interpolation operations on the updated object-oriented interpolated data container.

2. The method of claim 1, wherein the object-oriented interpolated data container comprises an extensible markup language (XML) container.

3. The method of claim 1, further comprising transmitting the object-oriented interpolated data container to a remote data store.

4. The method of claim 1, further comprising serializing the set of component objects.

5. The method of claim 1, wherein the application interface comprises a directory service.

6. The method of claim 1, wherein the set of applications operates on the object-oriented interpolated data container to generate an updated object-oriented interpolated data container.

7. The method of claim 1, wherein at least two of the set of applications operate on different portions of the object-oriented interpolated data container.

8. The method of claim 1, wherein at least two of the set of the applications operate on a same portion of the object-oriented interpolated data container.

9. The method of claim 1, wherein the further interpolation operations are initiated via an interpolation command received from the set of applications.

10. A system comprising:
an interface to a database to store operative data comprising a set of input data and a set of output data, wherein the set of input data comprises a set of interpolated input data generated to conformally map the set of input data to the set of output data; and
a processor, to communicate with the database via the interface, the processor to:
decompose the operative data into a set of component objects comprising at least one interpolated component object derived from the interpolated input data,
generate, in view of a determination that the set of output data can be generated with multiple combinations of elements from the set of input data, an object-oriented interpolated data container storing at least a portion of the set of component objects, the portion comprising at least one interpolated component object,
expose the object-oriented interpolated data container to a set of applications via an application interface, wherein the set of applications operates on the object-oriented interpolated data container to generate an updated object-oriented interpolated data container, and
in response to a request from one application from the set of applications that corresponds to a variable in the updated object-oriented interpolated data container whose value is invalid, perform further interpolation operations on the updated object-oriented interpolated data container.

11. The system of claim 10, wherein the object-oriented interpolated data container comprises an extensible markup language (XML) container.

12. The system of claim 10, wherein the processor is further to transmit the object-oriented interpolated data container to a remote data store.

13. The system of claim 10, wherein the processor is to serialize the set of component objects of the set of operative data.

14. The system of claim 10, wherein the application interface comprises a directory service.

15. The system of claim 10, wherein the set of applications operates on the object-oriented interpolated data container to generate an updated object-oriented interpolated data container.

16. The system of claim 10, wherein at least two of the set of applications operate on different portions of the object-oriented interpolated data container.

17. The system of claim 10, wherein at least two of the set of the applications operate on a same portion of the object-oriented interpolated data container.

18. The system of claim 10, wherein the further interpolation operations are initiated via an interpolation command received from the set of applications.

\* \* \* \* \*